Figure 1:
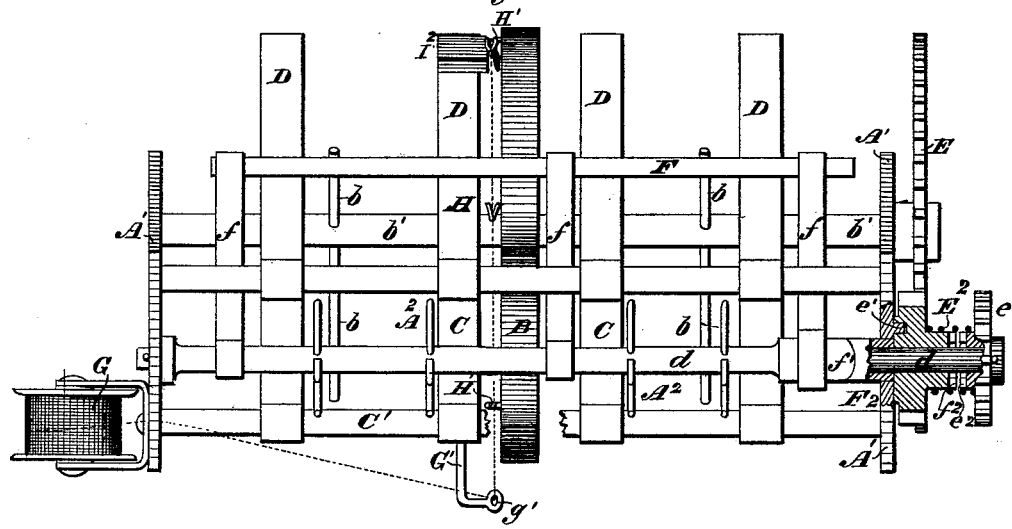

6 Sheets—Sheet 1.

L. A. SCOVIL.
GRAIN-BINDER.

No. 188,032. Patented March 6, 1877.

WITNESSES.
Wm. A. Skinkle
F. Stich

INVENTOR.
Lyman A. Scovil.
By his Attorney
Wm. D. Baldwin

6 Sheets—Sheet 2.
L. A. SCOVIL.
GRAIN-BINDER.
No. 188,032. Patented March 6, 1877.
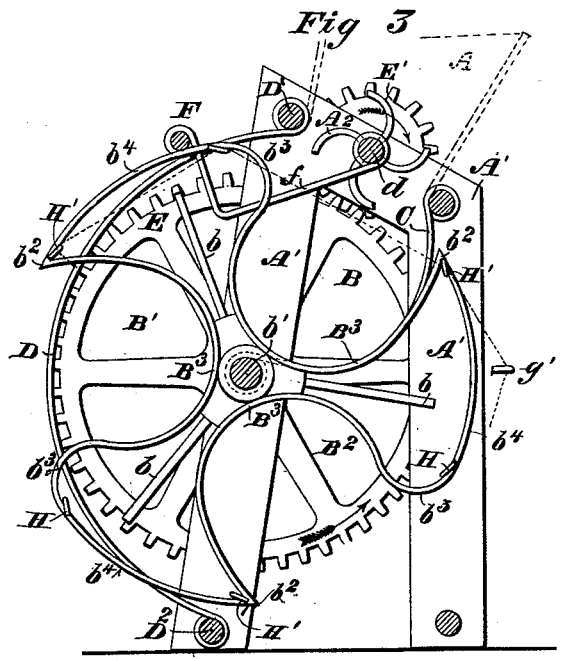
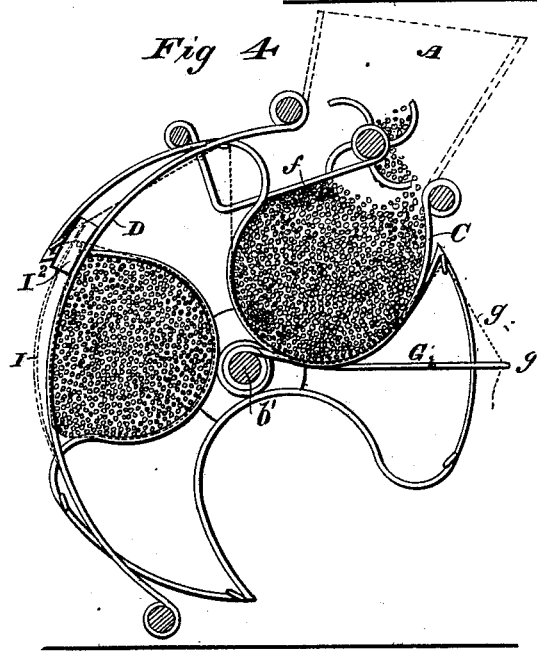
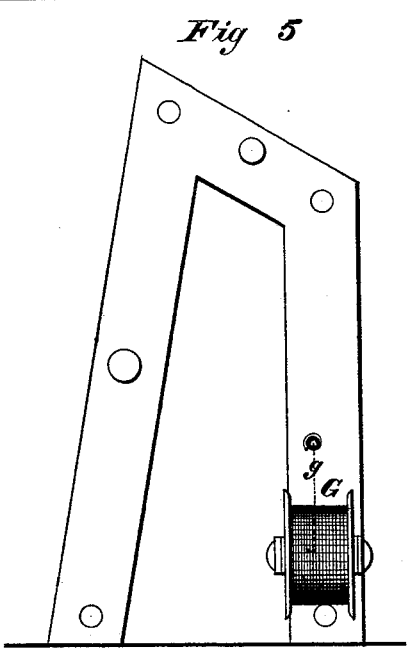
WITNESSES
INVENTOR
Lyman A. Scovil
By his Attorney 6 Sheets—Sheet 3.

L. A. SCOVIL.
GRAIN-BINDER.

No. 188,032. Patented March 6, 1877.

WITNESSES
Wm A Skinkle
F. Stith

By his Attorney

INVENTOR
Lyman A. Scovil
Wm D. Baldwin

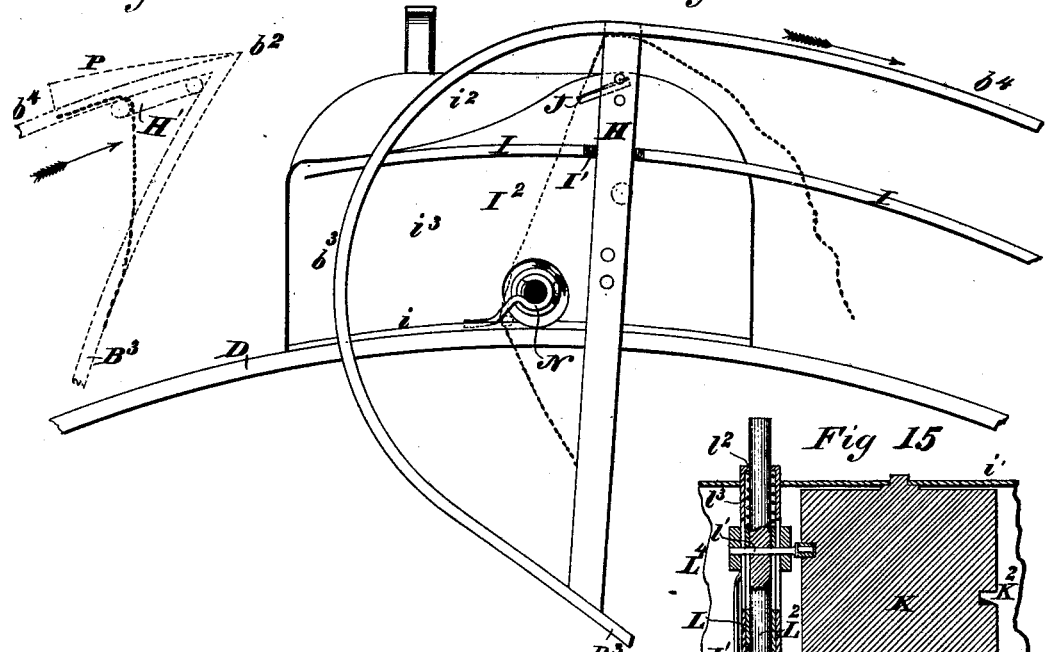
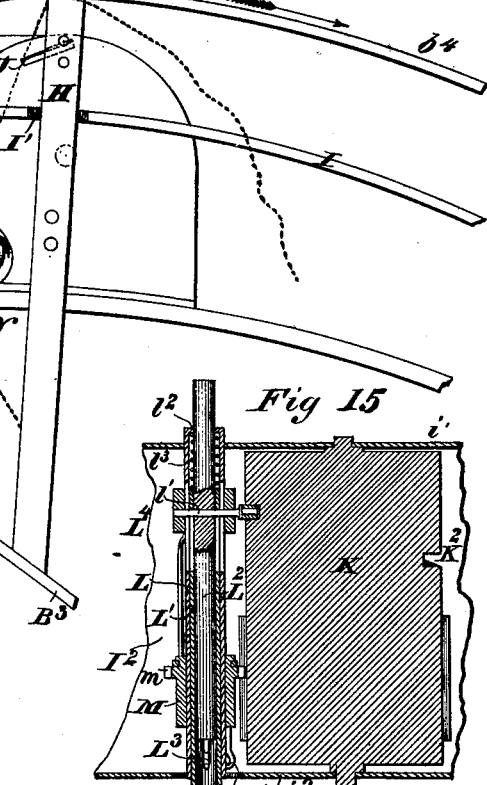
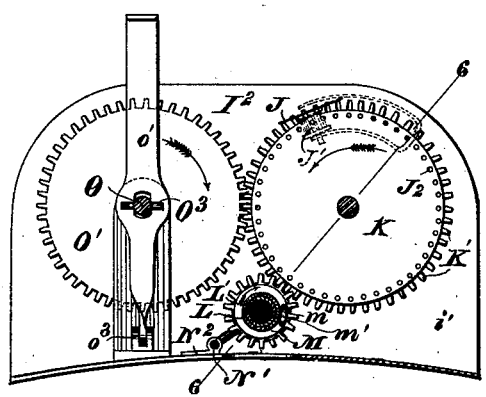
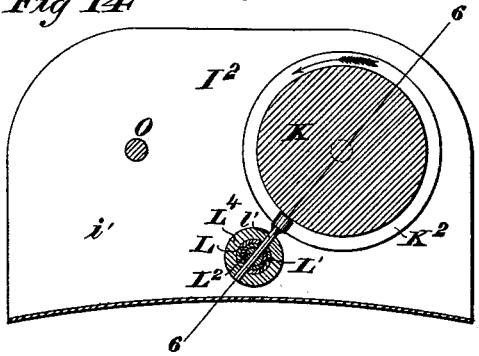

L. A. SCOVIL.
GRAIN-BINDER.

No. 188,032. Patented March 6, 1877.

6 Sheets—Sheet 5.

WITNESSES
Wm A. Skinkle
F. Stith

INVENTOR
Lyman A. Scovil
By his Attorney
W. D. Baldwin

6 Sheets—Sheet 6.

L. A. SCOVIL.
GRAIN-BINDER.

No. 188,032. Patented March 6, 1877.

WITNESSES.
Wm A Skinkle
F. Stith.

By his Attorney
Wm D. Baldwin

INVENTOR
Lyman. A Scovil.

N. PETERS, PHOTO-LITHOGRAPHER, WASHINGTON, D. C.

UNITED STATES PATENT OFFICE.

LYMAN A. SCOVIL, OF CIRCLEVILLE, OHIO, ASSIGNOR TO HIMSELF AND LYMAN E. SCOVIL, OF SAME PLACE.

IMPROVEMENT IN GRAIN-BINDERS.

Specification forming part of Letters Patent No. 188,032, dated March 6, 1877; application filed April 17, 1876.

*To all whom it may concern:*

Be it known that I, LYMAN A. SCOVIL, of Circleville, in the county of Pickaway and State of Ohio, have invented certain new and useful Improvements in Automatic Grain-Binding Mechanism, of which the following is a specification:

The first part of the invention relates more particularly to grain-binding mechanism of the class in which grain is automatically delivered into the receptacle and compressed and bound while being carried away from the point at which it entered the receptacle.

The first part of my invention consists in the combination, with an intermittently-moving receptacle, of a stationary receiver and continuously-revolving mechanism for feeding grain to the receptacle, when in proper position, and to the receiver during the movements of the receptacle, ready to be gathered up thereby and form part of the gavel with which it is filled.

The object of the next part of my invention is to insure gavels of uniform size, to which end I combine, with an intermittently-moving receptacle, a mechanism for packing or pressing the grain therein, and automatic direct-acting apparatus, which, owing to the pressure of the grain itself, connects the receptacle with mechanism which positively starts in motion and moves the receptacle when filled to the proper point.

The object of the next part of my invention is to compress the gavel positively as the receptacle moves from the point at which the grain is received to the point where it is to be bound, which end I attain by the combination of an intermittently-moving grain-receptacle with fixed eccentric bars or walls, between which and the receptacle the gavel is compressed as conveyed from one point to the other.

The next part of my invention relates especially to that class of grain-binders which ties a knot in a cord.

Its objects are to perform these operations in a simple and effective manner, which ends I attain by the combination of a stationary tube, an endwise-moving tube therein, a hook working endwise in said inner tube, and a revolving endwise-moving hook working outside of said tube.

My invention also consists in the combination of a series of intermittently-moving receptacles rotating around a common axis; mechanism for feeding the grain to said receptacles in turn; mechanism which, when a given amount of grain is fed into the receptacle in position to receive it, positively sets in motion and causes the receptacle to partially rotate to bring another receptacle in position to receive the grain; and mechanism for compressing and binding the gavel in the filled receptacle, and leave it ready to be discharged upon a subsequent partial rotation of the series of receptacles, whereby the receptacles are in turn filled, the grain compressed, bound, and discharged by the connected and successive operations of mechanism.

My invention further consists in certain novel combinations of mechanism hereinafter specifically designated.

In the accompanying drawings all my improvements are shown as embodied in one machine in the best way now known to me. Obviously, however, some of these improvements may be used without the others, and in machines differing in construction from the one herein shown. The details of construction of the several parts may also be varied to some extent without departing from the spirit of my invention.

Figure 2:
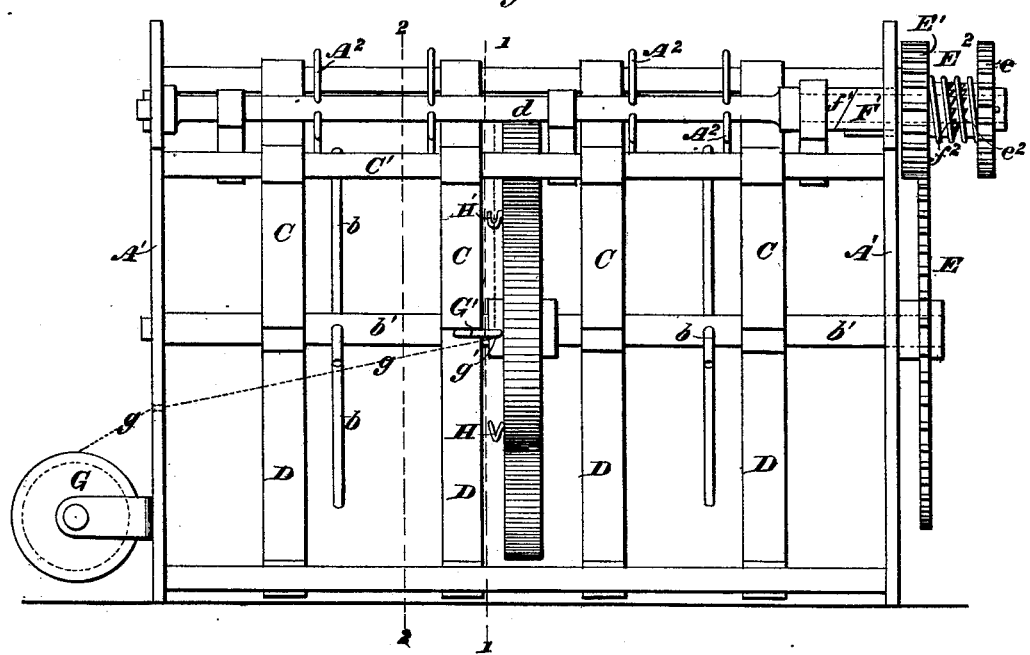
Figure 6:
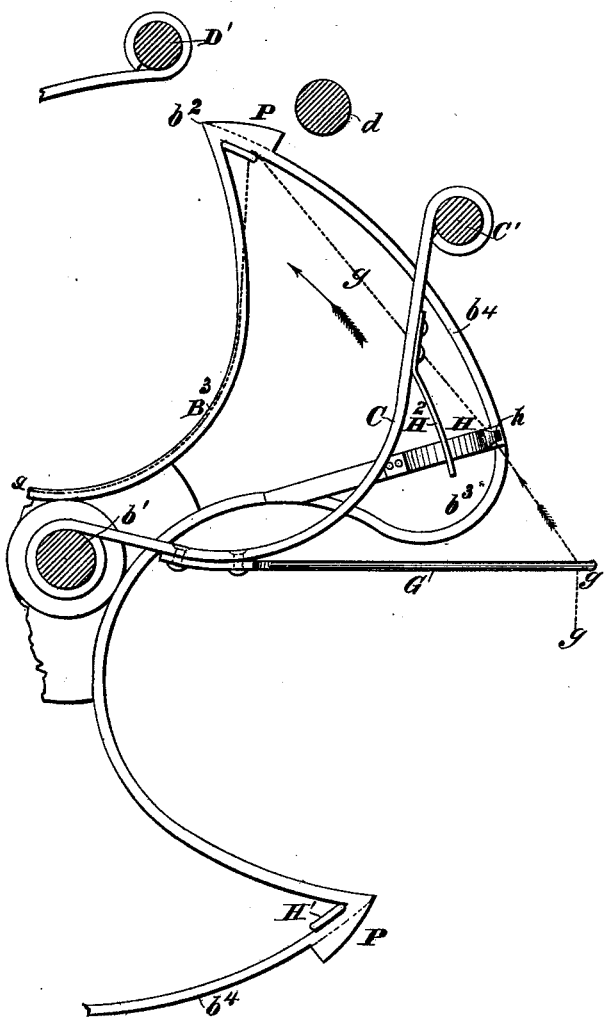

Figure 1 is a plan or top view of the receptacles, the compressor, the tying mechanism, the rake or packer, and operating mechanism, partly in section; Fig. 2, a view, in elevation, of parts shown in Fig. 1; Fig. 3, a vertical section on the line 1 1 of Fig. 2; Fig. 4, a similar section on the line 2 2 of Fig. 2, showing one of the receptacles in the position occupied just after having discharged a bound gavel, a gavel being tied and another accumulating; Fig. 5, an end elevation of the frame for supporting the binding mechanism; Fig. 6, a vertical section, on an enlarged scale, of portions of the binding mechanism, showing the positions assumed by a filled receptacle just after starting toward the compressor and tying mechanism, at the time the cord-clamp is being operated upon to cause it to grasp the cord; Fig.

Figure 10:
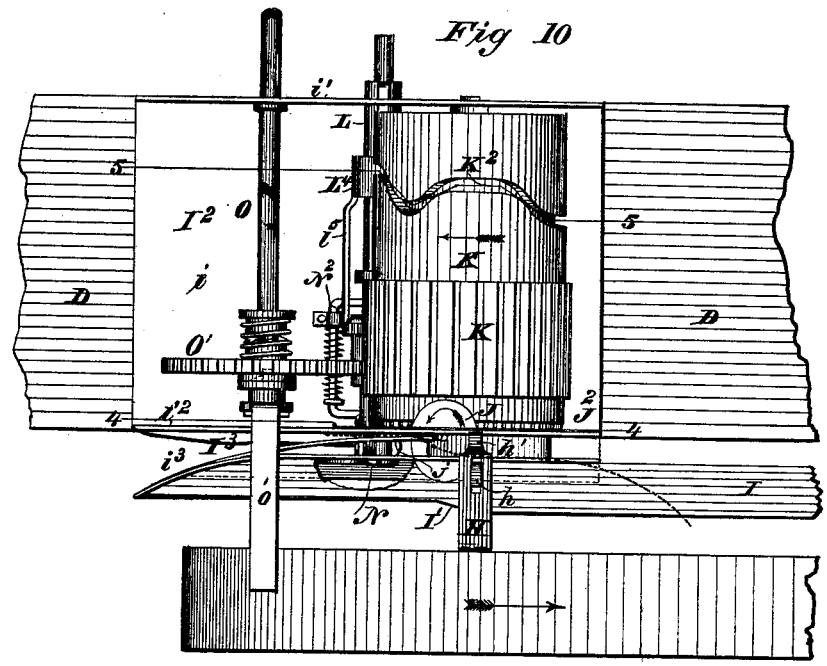
Figure 11:
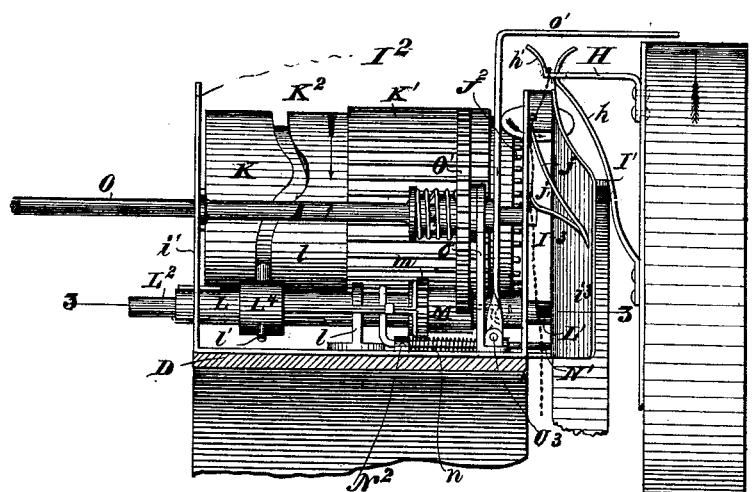
Figure 12:
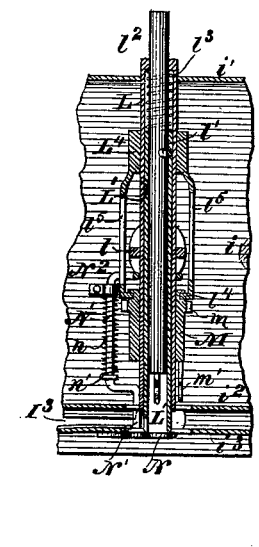
Figure 17:
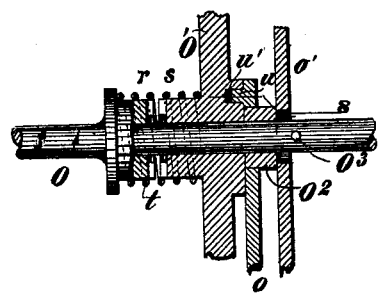
Figure 19:
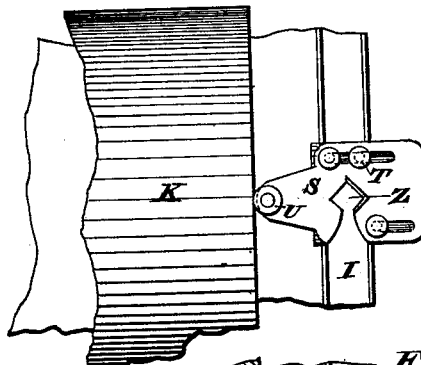
Figure 18:
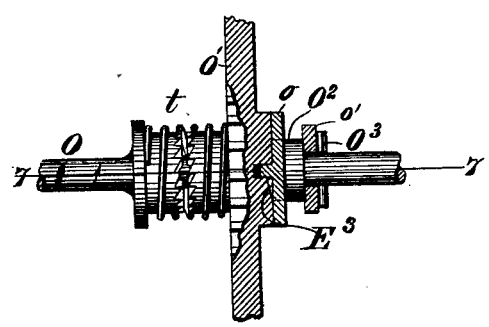
Figure 20:
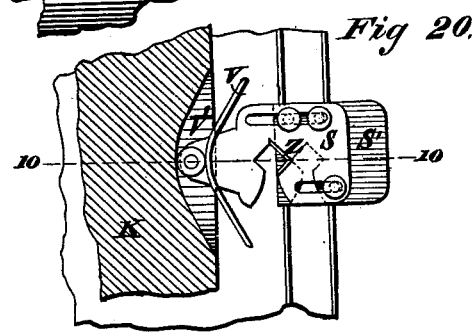
Figure 21:
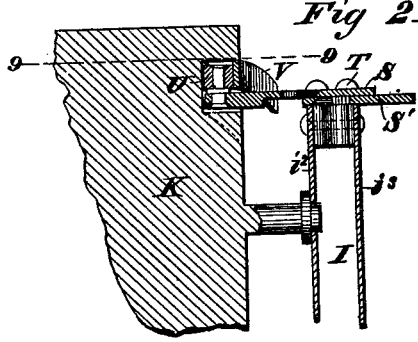
Figure 16:
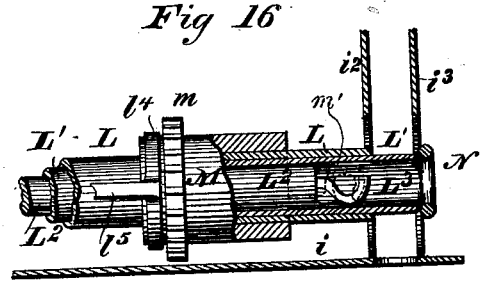
Figure 22:
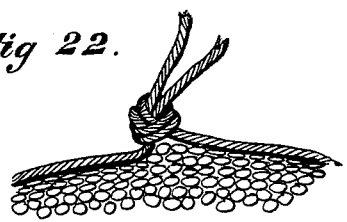

7, an elevation of parts shown in Fig. 6; Fig. 8, a view, on an enlarged scale, of a portion of a receptacle in the act of passing the tying mechanism and supplying the cord thereto; and Fig. 9, a portion of the front end of the peripheral portion of the holder between the receptacle being filled and the following receptacle, showing the incline for throwing into operation the tying mechanism for tying the gavel in the preceding receptacle; Fig. 10, a top or plan view of the tying mechanism and parts connected therewith, on an enlarged scale; Fig. 11, a view, in elevation, of Fig. 10; Fig. 12, a longitudinal section on the line 3 3 of Fig. 11, through the tubes and parts connected therewith, of the knot-tier; Fig. 13, a transverse section on the line 4 4 of Fig. 10; Fig. 14, a transverse section on the line 5 5 of Fig. 10; Fig. 15, a longitudinal section on the lines 6 6 of Figs. 13 and 14; Fig. 16, an enlarged view of portions of the knot-tying tubes and parts connected therewith, partly in section, showing the positions assumed when the mechanism is at rest; Fig. 17, a detail view of the clutch and starting mechanism of the knot-tier, partly in section, on the line 7 7 of Fig. 18; Fig. 18, a plan view of the same, partly in section, on the line 8 of Fig. 17; Fig. 19, a plan view of a modification of the string-cutter and its operating devices, showing the parts when at rest; Fig. 20, a similar view, in section, on line 9 9 of Fig. 21, showing the cutter when moved to sever the string; and Fig. 21, a longitudinal section of the same on the line 10 10 of Fig. 20. Fig. 22 is a view, in perspective, of a portion of a bundle with the string around it, and the knot therein as formed by the tying mechanism.

The cut grain is conducted by an elevating-apron, or other usual well-known means, to a hopper, A, mounted upon a suitable frame, $A^1$, secured upon the main frame of a harvester in usual well-known way. This frame also supports the binding mechanism. From the hopper the grain is fed by a revolving rake or packer, $A^2$, into one or other of a series of binding-receptacles, B $B^1$ $B^2$, composed, in part, of a series of parallel bars, $b$, mounted upon a shaft, $b^1$, which is partially rotated at suitable intervals in bearings in the frame, and driven by gearing in any suitable well-known way. In addition to the rows of parallel bars $b$, the receptacles B $B^1$ $B^2$ are provided with curved holders or receivers $B^3$, secured to the shaft $b^1$ at or near its center. The holders serve to separate the different bundles, and may be formed of one strip or bar, or of several connected, bent so as to leave peripheral openings for the admission and discharge of the grain. The bundles of grain are confined by the holders within narrower limits about their centers than elsewhere by the bars $b$, thus facilitating the application of the bands or cords. The edges $b^2$ of the holders are, by preference, pointed and the edges $b^3$ rounded, while their peripheral portions $b^4$ are curved, for a purpose presently to be explained.

A stationary receiver or receptacle for the grain may consist of curved rods O, with their inner or lower ends secured loosely upon the shaft $b^1$, and their outer or upper ends secured to a cross-bar, $C'$, of the frame. This receiver maintains the parallelism of the grain during the time the movable receptacles are being filled, and for a portion of the time occupied in changing their positions. As a filled receptacle moves away from the rake, the periphery $b^4$ of its central portion or holder $B^3$ prevents the grain entering the stationary receiver until the opening in the following receptacle moves in position to allow it to fall first into the stationary receptacle, and afterward be taken up by the empty movable receptacle.

A compressor, which may be formed of a single piece, slotted, or of a series of bars, D, secured at their ends to cross-bars $D^1$ $D^2$ of the frame, and curved eccentrically to the shaft $b^1$ of the receptacles B $B^1$ $B^2$, compresses the grain in each of the receptacles in turn, the grain in each gavel being confined between the bars $b$ and the holders or gavel-separators $B^3$ and the walls or bars of the compressor as it passes into the space of gradually-diminishing area formed between the shaft $b^1$ and the compressor. Each of the holders $B^3$, it will be observed, by reason of its curved form, compresses the gavel at the place it is embraced by the holder to a greater extent than elsewhere, and into proper form for binding, as will hereinafter be described. Thus, when the bundle is discharged and its ends are free to expand still more, the binding-string around the center of the bundle is prevented from accidentally becoming detached by endwise movement.

In order to insure the binding of the bundles of uniform size transversely irrespective of the character of the grain being cut, I rotate the receptacles by means of a gear-wheel, E, on the shaft $b^1$ meshing into a loose gear, $E^1$, upon the shaft $d$ of the rotating rake or packer $A^2$, the gears being thrown into or out of gear with the rotating rake-shaft (which may be continuously revolved by the pinion $e$) by means of clutch mechanism and a shipping lever or frame, which latter consists, in this instance, of a series of bent bars, $f$, each pivoted at one end upon the rotating rake-shaft $d$, and connected by a cross-bar, F, at their opposite or outer ends. When the receptacle receiving grain is empty or only partially filled, this cross-bar lies upon the top of the compressor, with its levers or bent bars $f$ projecting between the bars of the compressor and into the receptacle; but as the receptacle fills with grain the shifting lever or frame is forced up, its bars being moved outward from the receptacle by the pressure of the grain until the wedge-shaped or inclined end of a collar, $f^1$, secured loosely upon the shaft $d$, and upon the end of one of the levers or bars $f$, causes a sleeve, $F'$, on the shaft $d$ to move endwise through the frame $A^1$, and correspondingly move and thus disengage the pinion $E^1$ from a fixed stop or pin, $e^1$, on the frame $A^1$. At the same time a coiled spring, $E^2$, which tends always to throw the pinions $E^1$ and $e$ apart, yields, and the clutches $f^2$ $e^2$, respectively carried by the sliding pinion $E^1$ and pinion $e$, engage with each other. The pinion $E^1$ now revolves with its shaft, and rotates the wheel E and the shaft $b^1$ of the receptacles B $B^1$ $B^2$ one-third of a revolution, thus moving the filled receptacle to a position to be bound, a previously-bound bundle to a position to be discharged, and bringing an empty receptacle in position to be filled. While the receptacle to be filled is moving into position beneath the rake or packer $A^2$, and the filled receptacle is passing to the position to be bound, and the receptacle containing a previously-bound bundle to a position to discharge its gavel, the outside segmental portion or periphery $b^4$ of the holder of the filled receptacle prevents the entrance of the grain to the stationary receiver C between the holders of adjacent receptacles, allowing the grain thus accumulated to drop through the opening in the following empty receptacle into the stationary receiver, ready for the empty receptacle when it reaches the point at which it stops, and is locked to be filled or packed with grain. The relative sizes of the gears E and $E^1$ are such that a complete revolution of $E^1$ causes one-third of a revolution of E.

When the filled receptacle has moved a sufficient distance to carry the grain therein from beneath, and from contact with the levers or bars $f$ of the automatic shipping-frame, it falls by its own weight, the bars returning to a position to be again operated by the grain in the next receptacle, and leaving the sliding non-rotating sleeve or tube $F'$ free to move inward on the shaft of the rake $A^2$, and thus allow the spring $E^2$ to move the pinion $E^1$, to disengage it from the pinion $e$ when the stop-pin $e^1$ comes in line with the hole or socket in the pinion, to receive and lock it on the completion of the revolution of this pinion $E^1$. While the pinions $e$ $E^1$ are clutched together, the inner face of the pinion $E^1$ moves in contact with the end of the stop $e^1$, ready at the proper time to engage with the stop, and be held stationary until another partial revolution of the gear E, and consequent movement of the receptacles, is to take place. The socket in the pinion $E^1$ for the pin has, by preference, an inclined groove, $E^3$, leading from it, and terminating flush with the face of the pinion, as shown in Fig. 18, which, as will readily be seen, insures the clutches $e^2$ $f^2$ completely engaging with each other the depth of the ratchets after being thrown together by the sliding sleeve, so that the points of the ratchets engage sufficiently to cause them to move with each other. Accidents which might occur from the failure of the sliding sleeve to completely engage the clutches are thus avoided.

The advantages attained by insuring gavels of uniform size will readily be appreciated by those familiar with this class of mechanism.

The cord for binding is wound upon a drum or spool, G, mounted in bearings upon the frame $A^1$, and passes, by suitable guides, to the receptacles B $B^1$ $B^2$. In this instance the spool is mounted upon the outside of the supporting-frame of the binding mechanism near its base, and the string $g$ passes first through an opening in the frame, and then through an eye, $g'$, in the end of an arm, $G'$, secured to the under side of one of the bars of the stationary receiver C. The guiding-eye $g'$ is, by preference, located slightly in front of the peripheries of the central portions or holders $B^3$ of the receptacles, and in a vertical plane corresponding with that in which revolve holders or clamps for carrying the string on the edges of the peripheries of the holders. In this instance each periphery $b^4$ is provided with a clamp, H, and a simple supporting-hook or carrier, $H^1$, at or near its opposite ends, the clamp being near the rear rounded end $b^3$, and the supporting-hook near the front sharp or pointed end $b^2$, of the curved peripheries.

In starting the machine, the end of the string is led to the clamp H of one of the receptacles, and beyond this clamp to the hook $H^1$, and the series of receptacles given a partial rotation, to bring one of them with the string extending across the opening in its holder $B^3$, beneath the rake $A^2$, to receive the grain. While the receptacle is being filled the string yields beneath the weight of the grain unwinding from the spool for this purpose, as it also does when the receptacle, having been filled, is automatically caused to move to the binding position past the compressor D, as before described. While the filled receptacle is moving to the binding position the clamp H of the following receptacle, which first supported or loosely held the string, is caused automatically to grasp the string—in this instance by means of an inclined plate or cam, $H^2$, fixed upon one of the bars of the stationary receiver C, (see Figs. 6, 7,) and a spring-finger, $h$, between the outer curved end of which and the curved bearing $h'$ of the fixed part of the clamp the string rests when first taken by the clamp. As the spring arm or finger $h$, during the movement of the receptacles, slides against the edge of the incline $H^2$, it is caused to move away from the outer curved portion $h'$ of the clamp, and allow the string to drop from its loose support between the forks of the clamp to a position to be clamped when the finger $h$ passes from the incline by the continued movement of the receptacle, and held between the finger and outer portion of the fixed part of the clamp with sufficient firmness to draw the cord from the spool. The cord is thus clamped before the filled receptacle reaches the binding position, and is held during the filling of the receptacle next the one brought to the position for binding or tying.

The tying mechanism is mounted in a suitable case or frame, I², upon the outside of one of the compressor-bars D, in such position as to be about opposite the rear edge of a receptacle when occupying the binding position.

As shown in Figs. 8, 10, and 11, the spring-finger $h$ comes in contact with a cam or inclined surface, I¹, and its curved end is moved away from the end of the fixed part of the clamp H, thus opening the forks of the clamp, and relieving the string of the pressure which has heretofore held it, and allowing the loose portion of the string extending to the preceding supporting-hook H¹ to run through the clamp-hook H freely as the receptacle continues to revolve. In this instance the cam I¹ begins to act upon the clamping-hook just after it has passed the center of the tying or knot-forming mechanism, and is in the position shown in Figs. 8, 10, and 11. This cam or inclined surface I¹ may either be formed on the inner edge of the compressor-bar D, next the receptacle-holder B³, or be made, as shown in the drawings, on a separate bar, I, which is securely fastened at one end to the frame I² of the tying mechanism, while the other end is carried around to a suitable distance and secured to the compressor-bar D, as shown by dotted lines in Fig. 4. It is essential that the spring-finger $h$ should remain away from the curved outer end of the fixed member of the clamp-hook H, thereby keeping open the clamp until all of the loose end of the string has passed through it; and to accomplish this the edge of the bar I continues in the same vertical plane as the cam I¹, or is made with a regular surface extending from the point where the cam terminates a distance sufficient to continue to hold the clamp H open until all the loose end of the string has passed through, when it recedes to the edge of the compressor-bar D, to which it is secured at its end opposite to that on which the cam is formed. The clamp-hook H then remains inoperative, with its forks together, until again brought in contact with the string by the movements of the receptacles, as hereinbefore described. When a receptacle is filled and moves off with its gavel, its hook H draws the string through the eye $g'$ until the following hook H engages with or clamps it, as hereinbefore described. Up to the time the gavel is passed to the tying mechanism the string has only partially encircled it, a portion equal to about one-third of its circumference being held in place by the bars of the compressor D. The loose portion of the string from the clamp H to the preceding hook H¹ is to embrace that part of the gavel around which the string has not already been passed; and this result is attained as follows: When the leading or clamp hook H releases its hold on the string after passing it into the tying mechanism, the gavel, which continues moving until the hook H¹ has passed the center of the tying mechanism, will draw the loose end of the string just released by the clamp-hook H until the receptacle ceases to move, at which time nearly all of the loose end has been drawn through the tying mechanism, leaving but little more than enough to form the knot, (in practice about two inches.) This completes the encircling of the gavel with the string; for by the time the movement of the gavel ceases the hook H¹ has passed the center of the tying mechanism and brought that part of the string which leads from it to the gavel in such position in the tying mechanism as to insure its being firmly held by the latter, and also presses it against the loose end, which is already engaged with the tying mechanism, thereby bringing the two ends in contact. The string held by the hook H¹ will be cut by the tying mechanism at this point, as will be hereinafter more fully described. The tying-mechanism frame I² consists, in this instance, of a bottom plate, $i$, and two side plates, $i^1$ $i^2$, in which the mechanism for tying the knot is mounted, and an additional side plate, $i^3$, which is curved at its forward end away from the side plate $i^2$, thereby increasing the width of the string-guide or opening I³ between them, to insure the string being properly passed into the tying mechanism by the guideway thus formed between the plates $i^2$ and $i^3$.

The bottom plate $i$ is slotted between the side plates $i^2$ $i^3$, as shown in Figs. 10, 11, 12, 13, and 16, the slot extending from the front of the side plates, and gradually decreasing in size to a position under the knotting mechanism, where it terminates in an enlarged opening, through which the knot, when tied, is drawn. Fastened to the side plate $i^3$, and extending diagonally across the guideway or opening I³, between it and the plate $i^2$, are two string-holders, (shown, in this instance, as formed by spring-fingers $j$ and $j'$,) which serve to hold the string against a cutter or knife, J, while it is being cut, and also to prevent these ends from dropping when the string has been cut. These spring-fingers are sufficiently elastic to permit the string to be drawn between them and the plate $i^2$, and hold it while being cut. The cord is, in this instance, severed by a revolving cutter or disk, J, mounted in bearings between the side plates $i^2$ and $i^3$, in such relation to the knotting mechanism that the ends of the string, when cut, will just be of sufficient length to form the knot, and will be held by the spring-finger $j'$ in the proper position to be acted upon by the knot-tying apparatus. This cutter or knife is mounted upon a short shaft, which also carries a pinion, J¹, which gears into a crown-gear, J², on the end of a cylinder, K, and is caused to revolve thereby.

A stationary tube, L, is shown as supported at one end in the side plate $i^1$, and at or near its center by a bracket, $l$. The tube L incloses an endwise-moving tube, $L^1$, which, in turn, incloses a bar, $L^2$, also capable of endwise movement, and upon the inner end of which is a hook, $L^3$, the use of which will hereinafter be set forth. One end of the stationary tube L is on a line flush with the outer surface of the side plate $i^2$ of the string-guide $I^3$. Commencing near the outer end, and extending toward the middle, are two longitudinal slots, on opposite sides of the tube, and through which a pin, $l^1$, freely travels. At the extreme end of the tube is an internal annular flange, $l^2$, the hole through which is of the same diameter as the bar $L^2$, which slides freely back and forth through it. The inner tube fits snugly in the outer one, and moves freely in an endwise direction. When in a state of rest, the inner tube projects beyond the outer one and across the guide-space $I^3$, its end bearing against a stationary hook, N, (which is secured to the outer side of the plate $i^3$, and the uses of which will be hereinafter more fully set forth,) and is held in this position by a spiral spring, $l^3$, around the bar $L^2$, and bearing against the outer end of the inner tube, and also against the internal flange $l^2$ of the stationary tube L. The inner tube is slotted near its outer end in a manner similar to the stationary tube, except that the slot is not so long. When the inner tube is pressed forward until it meets the hook N, the forward end of its slot is on a line with the forward end of the slot in the stationary tube; but as the slot in the inner tube is much shorter than that in the stationary tube, the pin $l^1$, which traverses the entire length of the slot in the latter, will have reached the end of the slot in the inner tube and moved the tube itself until the end which projects from the stationary tube shall have been drawn entirely into it, at which time the backward movement of the pin will stop. As the pin again moves forward, the inner tube is moved with it, being acted upon by the spiral spring $l^2$, until it comes in contact with the hook N, where it remains, being held in position by the spiral spring until again withdrawn by the pin $l^1$.

The internal bar $L^2$ has a hole in it, through which the pin $l^1$ also passes, and this hole is so situated that when the pin has advanced to the extreme forward end of the slot, (the limit of its movement in that direction,) the hook $L^3$ on the end of the bar has passed through and projects beyond the stationary hook or guide N, and when the pin has reached the limit of movement in the opposite or backward direction the hook $L^3$ has been drawn some distance into the inner tube. An endwise-moving collar, $L^4$, encircles and traverses that part of the stationary tube L in which the slots are cut. The pin $l^2$ passes through holes in this collar, thereby locking it with the bar $L^2$, causing them to move endwise in unison.

Near the forward end of and also encircling the stationary tube is another collar, M, capable of a rotative and endwise movement simultaneously. The collars or sleeves $L^4$ M move endwise together. In this instance the latter has near its rear end a groove, in which a ring, $l^4$, is mounted. This ring is connected with the collar $L^4$ by means of rods $l^5$, securely fastened to the latter, which prevent its rotating with the collar M, but give them both an endwise movement with the collar $L^4$.

On the periphery of the collar M is a pinion, $m$, which gears into a spur-gear, $K^1$, on the cylinder K, and is so proportioned as to make three revolutions to one of the latter. From the forward end of the ring M projects a bar, terminating in a hook, $m'$, the open side of which is toward the direction of its rotation. Projecting across the guideway $I^3$, between the side plates $i^2$ and $i^3$, and beneath and slightly in front of the tube $L^1$, which also projects across the opening, is an endwise-moving bar, $N^1$, which serves to hold the string leading from the gavel away from the tube $L^1$ while the knot is being tied, and thereby cause the two ends of the string to be properly presented for tying. The bar $N^1$ is supported at its forward end by the side plate $i^2$, through which it passes, and at the other by a bracket, $N^2$, and the tube L, which it encircles between the collar M and the bracket $l$, and at such distance from the former that when the collar receives its extreme backward movement it engages with that part of the bar encircling the tube, and moves the whole bar until the other end has been withdrawn from the guideway $I^3$, and is thereby disengaged from the string. The bar is bent to permit it to pass the pinion $m$, and is encircled by a spiral spring, $n$, between the bracket $N^2$ and a collar, $n'$, on the bar, which holds the bar in its position across the opening until it is withdrawn by the action of the collar M. The pin $l^2$, which locks the collar $L^4$ and the bar $L^3$ together, extends at one end beyond the surface of the collar $L^4$, and carries a friction-roller, which works in a serpentine groove, $K^2$, in the periphery of the cylinder K, and from which it receives its endwise movement.

The teeth of the spur-gear $K^1$ are made long in order to keep the pinion $m$ in mesh, and still permit of its endwise movement on the tube L.

A continuously-rotating shaft, O, mounted in bearings in the side plates $i^1$ and $i^2$, carries a loose gear-wheel, $O^1$, which meshes into gear $K^1$, and has the same number of teeth, so that one revolution of $O^1$ will give one revolution to the cylinder K.

A mechanism somewhat similar to that already described for starting the receptacle is here employed to start the wheel $O^1$ at the proper moment. The clutches $r$ and $s$, the spring $t$, for keeping them apart when not employed, and the locking-pin $u$, with its hole $u'$, and incline groove $E^3$, to insure the proper engagement of the clutches, are similar to those before described.

A bracket, $o$, fastened to the bottom plate $i$, carries the locking-pin, and also forms a bearing for an endwise-moving collar, $O^2$, which encircles the shaft and bears against the side of the wheel $O^1$. An L-shaped lever, $o'$, pivoted at the bottom, and slotted where it encircles the shaft O, to permit of endwise movement on the shaft, bears against the other end of the collar, and is held in position, when not in action, between the collar and a pin, $O^3$, through the shaft. The shaft serves as a guide to the lever, and prevents any lateral motion of the latter. The horizontal part of the lever projects over the side plates $i^2$ and $i^3$, and partly across the periphery of the receptacle-holder $B^3$, as shown in Figs. 8, 10, and 11, and is high enough to permit the clamp H and open hook $H^1$ to pass clear.

Figure 7:
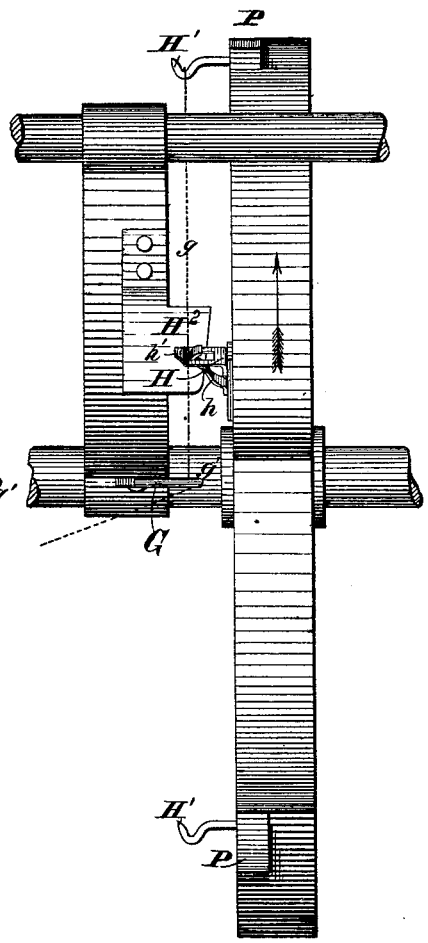

Near the forward or pointed end of each peripheral section of the receptacle-holder is a cam or incline, P, as shown in Figs. 6, 7, and 9, which passes under the end of the lever and forces it upward, causing the vertical part to rock forward on the pivot $O^3$, and, through the collar, push the wheel $O^1$ off the locking-pin and into engagement with the clutch on the shaft. This causes the wheel $O^1$ to make one revolution sufficient to cause the tying mechanism to sever the string and tie the knot, when the wheel is again locked by the locking-pin, and remains so until started by the cam P, following the next gavel. The cam P is so situated relatively to the hook H that the string between the hook and the gavel has entered the guideway $I^3$, and is drawn against the bar $N^1$ and tube $L^1$, and between the spring-fingers $j\,j'$ and side plate $i^2$, and almost against the revolving cutter J, before the wheel $O^1$ (and the cutting and knotting mechanism driven by it) has been started; but the cutter must be in full motion when the hook H draws the string against it, in order that the cutting may take place before the receptacle $B^1$ stops, which it does as soon as the string is severed.

The shaft O may be driven by any continuously-moving part of the harvester machinery; but I prefer to connect it either by a belt or a chain of gear-wheels to the continuously-rotating packer-shaft $A^2$.

When the tying mechanism has finished tying a knot it stops in the position shown in Figs. 10, 11, 12, 15, and 16, and is ready to receive and operate upon the string around the next gavel, in the manner which I will now proceed to describe. Both ends of the string surrounding the gavel having passed into the guide and been drawn under the spring-fingers, the mechanism is started by the cam P throwing the wheel $O^1$ into gear with the shaft O, as before described, and both ends of the string are cut to an equal length. At the starting-point the twister-hook $m'$ stands behind the tube L, and inside of the plate $i^2$; but during the operation of cutting the string it makes a half-revolution to the front of the tube, and then advances across the space $I^3$, passing in front of the string, and, by continued revolution, bringing both ends fairly into the hook. The ends are then pulled from under the spring-finger $j$ by the hook, which continues to rotate, winding the string around the tube $L^1$, and at the same time moving backward far enough to pass the string extending from the bar $N^1$ to the tube without engaging with it. After passing this part of the string the hook advances rapidly to the extreme end of its forward movement, thereby passing the ends of the string across and outside of that part of the string between the bar $N^1$ and the tube, and through the opening of the stationary guide-hook N, and across or into the opening of the hook $L^3$, which has also advanced until its opening is in line with the outer surface of the guide-hook N. Both the movable hooks are now moved backward, the hook $L^3$ drawing the end of the string out of the hook $m'$ and into the inner tube $L^1$, in the shape of a loop, thereby drawing the end of the string through the loop which has been formed by the string wound on the outside of the tube. At this moment the bridge bar $N^1$ is withdrawn from across the guideway $I^3$, and allows the string leading to the gavel to pass into the enlarged part of the slot in the bottom plate, and at the same time the tube $L^1$ is also withdrawn from across the opening and into the tube L, which forces or casts off the knotted loop, and leaves only the ends of the string which have been drawn into the tube $L^1$ by the hook $L^3$ in contact with the tying mechanism. These ends remain in the tube until the gavel is moved forward to be discharged, when they are drawn out by its action.

The ends, being doubled around the hook in the tube in the shape of a loop, as before mentioned, must (as the space in the tube is so confined) make a very short turn around the hook in order to be drawn from the tube, and, with the size of string used in practical operation, the force necessary to draw the ends from the tube is sufficient to tighten the loop which was cast off from the outside of the tube, and make a firm knot. As the ends of the string are drawn into the tube they cross its shell or wall by way of a notch in line with the opening in the stationary hook. By means of this notch the ends of the string cross that portion held just above the rod $N^1$, which bridges the guideway $I^3$ in close contact, thus enabling the knot to be formed with the least amount of slack between the knot-tying mechanism and the gavel being bound. The knot-tying mechanism, it will be seen, is arranged as close as possible to the center of the gavel, so that when the knot is tied but slight expansion of the bundle can take place.

Figs. 19, 20, and 21 show a modified form of cutting mechanism adapted for use in connection with the tying mechanism, and constructed and operating as follows: A lug, U', resting between and securely fastened to the side plates $i^2$ and $i^3$, has upon its top a plate, S', which rests on top of, and extends beyond, the side plates. Near the center of the plate is a diamond-shaped hole, from one corner of which, and leading to the front edge of the plate, is a tapering slot equal in width at the edge of the plate to the width of the guide-way $I^3$. The edges of the hole nearest the side plate $i^2$ are sharpened to a cutting-edge, making a V-shaped knife. A plate, S, provided with a hole having sharpened edges like those of the plate S', to make a shear-cut, and a slot corresponding to that in the plate S', is placed on top of the latter, and held to it by rivets, which, however, pass through slots in the upper plate, and allow it to slide freely in an endwise direction over the lower plate. A tongue projects from this upper plate toward the cylinder K, (which, in this instance, is shorter than that used for the circular form of cutter described,) and almost touches it. On the end of this projection is fastened a pin, which carries a friction-roller, U. This roller rolls against the face or end of the cylinder K, and holds the cutter open, as shown in Fig. 19, until the cylinder, in its revolution, brings the cam V in contact with, and the slot V' opposite to, the roller, when the inclined plane of the cam forces the roller into the groove V', thereby moving the plate S endwise until its hole has entirely crossed that in the plate S', as shown in Fig. 20. Before this operation commences the string has been brought into the diamond-shaped openings in the two plates, and is held there by the spring-finger $j$. The forward movement of the plate S causes the cutting-edges in the two plates to pass each other, and thereby sever the string, and as soon as this is done, the plate is moved back by the roller U, which traverses the incline in the back of the groove V' until it has reached the face of the cylinder K, against which it rolls, and by which it is kept open until the string of the succeeding gavel is to be cut.

I claim as my invention—

1. The combination of an intermittently-moving rotating receptacle, to hold and carry the grain, a stationary slotted-bottomed receiver, upward through which the receptacle moves, a continuously-revolving rake or packer, to which the grain is fed, and mechanism for imparting motion to the receptacle at intervals, these members being constructed and operating substantially as hereinbefore set forth, whereby the grain is supplied directly to the receptacle when in proper position, and, during its movements, to the stationary receiver, ready to be gathered up by the receptacle, and held by it, while it is being completely filled, during a pause in its movements.

2. The combination, substantially as hereinbefore set forth, of a series of intermittently-moving receptacles, revolving around a common axis, a continuously-operating rake or packer, and mechanism by which the receptacles are presented in turn to be filled with grain, to automatically set in motion said mechanism.

3. The combination of a series of receptacles mounted on a common shaft, a continuously-revolving rake or packer, to which the grain is delivered, and by which it is fed into the receptacles, a shifting frame or lever, projecting within the path traveled by the peripheries of the receptacles, and rocking on the rake or packer shaft, clutch mechanism on said shaft, thrown into operation by the outward movement of the shifting-frame, a loose endwise-moving pinion, also carried by said rake-shaft, and a gear on the shaft of the series of receptacles, these members being constructed and operating substantially as hereinbefore set forth, whereby, upon the filling of one of the series of receptacles, the series is caused automatically to move the distance between two receptacles, and gavels of uniform size formed.

4. The series of receptacles, constructed, as hereinbefore set forth, of rows of parallel bars and central portions or holders, having curved peripheries, and openings to receive the grain.

5. The combination, substantially as hereinbefore set forth, of the rake or packer, the series of intermittently-moving receptacles, mechanism for partially rotating said receptacles at intervals, to bring them, in turn, in position beneath the packer to be filled, and the stationary receiver, into which the grain is fed during a portion of the time consumed by the movements of the series of receptacles, ready to be gathered up by them as they, in turn, are caused to move into the receiver, and pause to be filled, whereby waste is prevented and regularity in the formation of the gavels insured, as set forth.

6. The combination, substantially as hereinbefore set forth, of an intermittently-moving receptacle and a stationary compressor, eccentric to the axis of rotation of said receptacle, against the inner surface of which compressor the grain of the gavel is pressed as the receptacle moves, whereby the gavel is automatically compressed into a compact bundle for binding.

7. The combination, substantially as hereinbefore set forth, of the intermittently-moving revolving receptacles, cord-clamps carried by the receptacles, and a cord-guide, from which the cord passes to the clamps in turn, and is automatically seized by them, and carried across the openings in the receptacles through which the grain enters.

8. The combination of a series of intermittently-moving receptacles, rotating round a common axis, their curved central portions or holders, and a cord clamp and cord supporter or hook, mounted on the periphery of each of said holders, at or near the opposite ends thereof, these members being constructed and operating, substantially as set forth, to carry cord to encircle and tie each bundle.

9. The combination, substantially as hereinbefore set forth, of the receptacle, the cord-clamp, composed of a fixed part and a movable finger, between which the cord is supported, and a stationary incline, against which the finger moves to retract it, and allow the cord to drop into a position to be clamped by the subsequent passage of the finger from the incline before the receptacle reaches the position at which it receives the grain.

10. The combination, substantially as hereinbefore set forth, in a grain-binder, of a series of three receptacles, intermittently and partially rotated about a common axis at intervals, by mechanism substantially such as described, and automatic apparatus for connecting and disconnecting said receptacles and their rotating mechanism, thrown into operation by the pressure of the gavel upon the filling of the receptacles with grain, and acting directly upon the mechanism, by which the receptacles are positively started in motion, and caused to move one third part of a complete revolution at each movement.

11. The combination of a series of intermittently-moving receptacles, cord-clamps carried thereby, supports for loosely holding the cord, likewise carried by the receptacles, a guideway, into which the cord enters, and a cutter for severing the cord, these members being constructed and operating substantially as set forth, whereby the cord is caused completely to encircle the bundle, and is severed with its ends together, ready for tying, while leaving a portion of the cord in advance of the clamp of the following receptacle, for use in tying the succeeding gavel.

12. The combination, substantially as hereinbefore set forth, of the series of intermittently-moving rotating receptacles, the cord-clamps carried thereby, the compressor, the incline for relieving the cord from pressure by the clamps, and knot-tying mechanism, to which the cord passes when released by the clamps.

13. The combination of a cord-guideway, a stationary tube, an endwise-moving rotating hook, moving round said tube, an endwise-moving tube, working in the stationary tube, a non-rotating endwise-moving hook, working in the inner tube, and a stationary hook, these members being constructed and operating substantially as hereinbefore set forth, whereby a knot is tied in the cord, and the cord yieldingly held to tighten the knot as it is drawn from the tier.

14. The combination, substantially as hereinbefore set forth, of the cord-guideway, the cutter, the spring holders or fingers, and the tying mechanism.

15. The combination, substantially as hereinbefore set forth, of the cord-guideway, a spring-holder, $j'$, the knot-tying mechanism, and the endwise-moving bridge-bar, for the purpose specified.

16. The combination of the long-toothed gear-wheel, the endwise-moving pinion engaging therewith, the collar connected and moving endwise with the pinion, the pin carried by the collar, the cylinder revolving with the long-toothed gear-wheel, and having a serpentine groove, into which said pin projects, and the slotted stationary tube of the knot-tying mechanism, these members being constructed and operating substantially as and for the purpose hereinbefore set forth.

In testimony whereof I have hereunto subscribed my name.

L. A. SCOVIL.

Witnesses:
WM. A. SKINKLE,
BALTIS DE LONG.